United States Patent
Arndt

(10) Patent No.: US 12,191,073 B2
(45) Date of Patent: Jan. 7, 2025

(54) MAGNET DEVICE BASED ON THE BITTER PRINCIPLE AND USE OF A MAGNET DEVICE BASED ON THE BITTER PRINCIPLE

(71) Applicant: KARLSRUHER INSTITUT FUER TECHNOLOGIE, Karlsruhe (DE)

(72) Inventor: Tabea Arndt, Eggenstein-Leopoldshafen (DE)

(73) Assignee: KARLSRUHER INSTITUT FUER TECHNOLOGIE, Karlsruhe (DE)

( * ) Notice: Subject to any disclaimer, the term of this patent is extended or adjusted under 35 U.S.C. 154(b) by 165 days.

(21) Appl. No.: 18/245,899

(22) PCT Filed: Aug. 18, 2021

(86) PCT No.: PCT/EP2021/025312
§ 371 (c)(1),
(2) Date: Mar. 20, 2023

(87) PCT Pub. No.: WO2022/063425
PCT Pub. Date: Mar. 31, 2022

(65) Prior Publication Data
US 2023/0377785 A1    Nov. 23, 2023

(30) Foreign Application Priority Data

Sep. 24, 2020   (DE) .................... 10 2020 124 852.0

(51) Int. Cl.
*H01F 6/06* (2006.01)
*H01F 1/16* (2006.01)
(Continued)

(52) U.S. Cl.
CPC ................. *H01F 6/06* (2013.01); *H01F 1/16* (2013.01); *H01F 7/20* (2013.01); *H02K 1/02* (2013.01)

(58) Field of Classification Search
CPC .... H01F 1/16; H01F 7/20; H01F 6/06; H02K 1/02
See application file for complete search history.

(56) References Cited

U.S. PATENT DOCUMENTS 5,426,408 A * 6/1995 Jones ........................ H01F 6/06
505/211
7,609,139 B2 * 10/2009 Bird ..................... H01F 27/2847
336/155

(Continued)

FOREIGN PATENT DOCUMENTS

JP         H09277034 A   * 10/1997
WO    WO 89/03581 A1      4/1989

*Primary Examiner* — Mohamad A Musleh
(74) *Attorney, Agent, or Firm* — LEYDIG, VOIT & MAYER, LTD.

(57) ABSTRACT

A magnet device based on the Bitter principle includes a plurality of conductor layers and a plurality of substrate layers. Each respective substrate layer carries a corresponding conductor layer, and each respective substrate layer and corresponding conductor layer together form a respective ring having a radial slot. The plurality of conductor layers and the plurality of substrate layers together form three or more rings in a spiral arrangement with an initial ring, an end ring, and one or more middle rings. The initial ring and the end ring are, via a contact section, in current-conducting contact with at least one respective middle ring. Each middle ring is, via a contact section, in current-conducting contact with two other rings. The three or more rings are arranged such that a ring with a downward-facing conductor layer follows a ring with an upward-facing conductor layer.

12 Claims, 4 Drawing Sheets

(51) Int. Cl.
*H01F 7/20* (2006.01)
*H02K 1/02* (2006.01)

(56) References Cited

U.S. PATENT DOCUMENTS 7,825,760 B2 * 11/2010 Bird ................... H01F 7/202
335/282
2003/0184427 A1 * 10/2003 Gavrilin ................ H01F 7/20
336/200

* cited by examiner

MAGNET DEVICE BASED ON THE BITTER PRINCIPLE AND USE OF A MAGNET DEVICE BASED ON THE BITTER PRINCIPLE

CROSS REFERENCE TO RELATED APPLICATIONS

This application is a U.S. National Phase application under 35 U.S.C. § 371 of International Application No. PCT/EP2021/025312, filed on Aug. 18, 2021, and claims benefit to German Patent Application No. DE 10 2020 124 852.0 filed on Sep. 24, 2020. The International Application was published in German on Mar. 31, 2022 as WO/2022/063425 under PCT Article 21(2).

FIELD

The disclosure relates to a magnet device based on the Bitter principle and the use of a magnet device based on the Bitter principle.

BACKGROUND

Various types of magnets are known from the prior art which are able to generate strong continuous magnetic fields. The fields are limited to approximately 2 tesla in electromagnets having an iron core and wound with copper. For stronger fields, magnets made of copper or copper alloys with a Bitter design are used, called Bitter electromagnets or Bitter solenoids (Bitter magnets for short), which can generate strong continuous magnetic fields of up to 40 tesla and are primarily used in the scientific field.

Conventional Bitter magnets consist of slotted plates of copper or copper alloys stacked one above the other and are cooled with water. They require insulation between the individual copper plates. Due to its ohmic resistance, such a magnetic system requires power supplies at levels up to 30 MW. The high thermal load associated with the high resistance only permits current densities up to approximately 30 A/mm2 and requires intensive cooling.

(Bitter) magnets with superconductors are produced as layered coils or stacked disk coils. This winding architecture has the consequence that a plurality of layers of different materials follow one another in the radial direction (for example, inner winding body, potting compound, insulation, electro-thermal stabilization, for example copper, mechanical stabilization (e.g., substrate), buffer layers, (high-temperature) superconductor layer or filaments, cap layer, made, for example, of silver or gold, copper, insulation). Each material has different thicknesses, mechanical strengths and thermal expansion coefficients, which can lead to high (transverse) stresses and also to disintegration of the winding or to delamination and degradation of the superconductor.

In further developed "quasi-Bitter coils" made of high-temperature superconductors, the Bitter principle of a continuous current transmission through stacked disks is not followed, but instead individual continuous currents are generated in individual rings with interposed insulating disks.

The disadvantage of the aforementioned magnetic constructions is a high level of heat dissipation, which increases with the strength of the magnetic field that is to be generated. In order to reduce heat dissipation, the winding current density of each winding or each stacked layer must be reduced. However, this in turn results in a weaker maximum achievable magnetic field. Furthermore, they require very high drive currents.

SUMMARY

In an embodiment, the present disclosure provides a magnet device based on the Bitter principle. The magnet device includes a plurality of conductor layers and a plurality of substrate layers. Each respective substrate layer carries a respective corresponding conductor layer, and each respective substrate layer and corresponding respective conductor layer together form a respective ring having a radial slot extending through the entire respective ring. The plurality of conductor layers and the plurality of substrate layers together form three or more rings in a spiral arrangement with an initial ring, an end ring, and one or more middle rings. The initial ring and the end ring, each having an end adjacent to a respective slot are, via a contact section, in current-conducting contact with at least one respective middle ring of the one or more middle rings at an end of the respective middle ring adjacent to the respective slot. Each middle ring has two ends adjacent to a respective slot and is, via a contact section, in current-conducting contact with two other rings. The three or more rings are arranged alternately such that a ring with a downward-facing conductor layer follows a ring with an upward-facing conductor layer.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
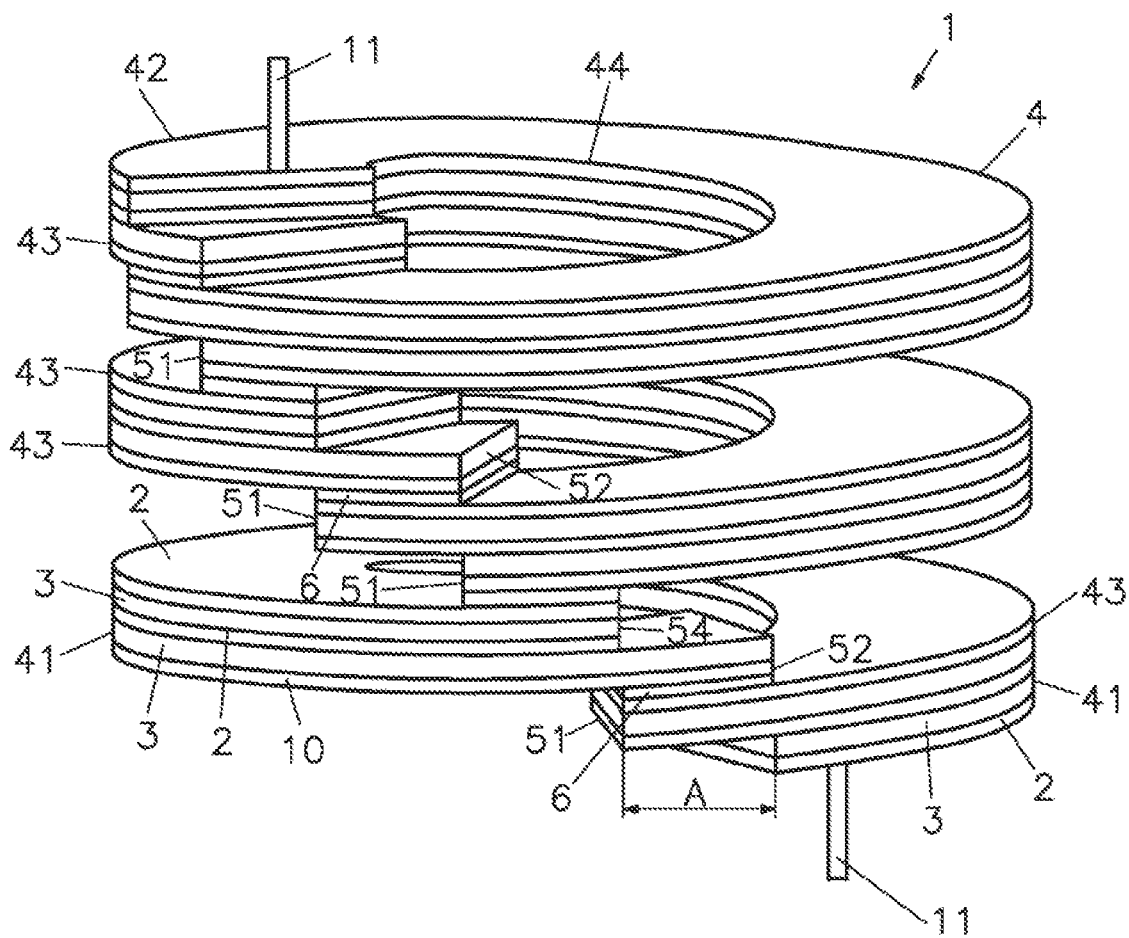
FIG. 1 a perspective view of the spiral arrangement of the magnet device without filler material.

The present disclosure provides an improved magnet device based on the Bitter principle which has a low thermal dissipation and permits a high winding current density thus making stronger magnetic fields possible.

A first embodiment of a magnet device based on the Bitter principle according to the disclosure has an arrangement which is formed from a plurality of conductor layers and a plurality of substrate layers. In this case, each substrate layer carries a conductor layer and with this takes the form of a ring. The ring has a radial slot extending through the entire ring. "Carries" means that the conductor layer is formed in two layers with the substrate layer and the more robust substrate layer forms a base for the conductor layer.

Three or more rings (preferably an even number, here in each case circular rings in the form of a flat piece between two different circles with the same center point, wherein the circle with the smaller diameter forms a central through-hole) form a spiral arrangement with a ring in each case at the beginning of the spiral arrangement (initial ring) and a ring at the end of the spiral arrangement (end ring), at least one or more rings between the initial ring and the end ring (middle rings), wherein the initial ring and the end ring with in each case one of their ends adjacent to the slot are, via a contact section, in current-conducting contact with a middle ring at its end adjacent to the slot, and wherein each middle ring with its two ends adjacent to the slot is, via a contact section, in current-conducting contact with two other rings. The spiral arrangement is preferably a helical arrangement and has a circular-cylindrical basic shape; however, other basic shapes are also possible, such as, for example, an ellipsoidal, rectangular or polygonal basic shape, the corners of which can be rounded.

In this case, the rings are arranged alternately in the arrangement, in that a ring with a downward-facing conductor layer follows a ring with an upward-facing conductor layer.

The spiral, which is formed by the arrangement of the individual current-conducting rings in the magnet device, permits continuous current transmission. In the radial direction, the rings are homogeneous and in the axial direction the rings are inhomogeneous, whereby mechanical transverse stresses are avoided. At least three rings, preferably four, five or even more such rings, which are geometrically identical and whose middle through-holes are in alignment in the spiral arrangement, are required to form them.

Because the middle through-holes are in alignment, in an assembly arrangement of the magnet device they surround a cylindrical space for experimental devices or other devices that are to be exposed to the magnetic field formed in this cylindrical space.

The device is referred to herein as a magnet device based on the Bitter principle, since it follows the Bitter principle known from the prior art. It is a layer-based principle in which plates or plate-shaped rings are assembled with intermediate layers of insulating materials to form layered magnets.

The spiral arrangement creates a magnet device with a significantly lower total resistance and losses than is the case with previously used Bitter magnets from the prior art. The magnet device based on the Bitter principle thus permits a high winding current density and stronger magnetic fields. Furthermore, the lower total resistance permits the power supply to be dimensioned smaller in terms of power than in the prior art, and the magnet device has low thermal dissipation due to the use of high-temperature superconductors.

In order to achieve continuous current transmission in the spiral arrangement, the rings are oriented alternately such that the conductor layers and the substrate layers each come into contact with one another: The initial ring begins with an orientation "conductor layer at the top" and the following middle ring continues the arrangement with an orientation "conductor layer at the bottom," thereby enabling a very compact design. The space requirement is optimized and less or no insulating material is required overall. The good heat dissipation leads to a greater quenching reliability at high winding current densities, i.e., above 200 A/mm2, especially when high-temperature superconductors are used. Depending on the operating temperature (thus also depending on the power requirement), the cooling can be carried out with various cryogens which are economical as regards consumption, such as, for example, liquid nitrogen, liquid neon, liquid hydrogen or liquid helium. Furthermore, higher operating currents can thereby be used than in the prior art and stronger magnetic fields can thus be achieved, e.g. 3 T at 100 A/mm 2 in a volume of approx. 10 cm3.

In a further embodiment of the magnet device, two rings contacting each other overlap at the contact section. An overlap produces an improved electrical contact between two conductor layers that face each other and enables continuous current transmission in the magnet device. An insulation layer or electrically poorly conductive layer can be present in interfaces between two conductor layers lying one above the other, with the exception of the contact section. As a result, large time constants can be prevented in the event of a change in the operating current and subsequent current redistribution.

According to a further embodiment of the magnet device, a contact material is applied in a planar manner to the contact section, or to the surface between the overlapping rings. Alternatively, at the contact section the conductor layers that face each other of the two contacting rings can be sintered together. As a result, a bonded connection can be produced. Both the application of a contact material and the sintering serve to improve the electrical contact and thus improve a continuous current flow and to keep it low-loss.

In a preferred further embodiment of the magnet device, the contact material is a material which is superconducting during operation of the magnet device based on the Bitter principle. The material can be a thin layer, preferably an indium or niobium layer, for example an AgIn solder. Simple solders or solder connections can also be used, for example solders which contain lead or tin. The thin layer acts like an interposed foil, which is pressed between two rings in the finished magnet device and thus already creates a good frictional contact between the contacting ends, adjacent to the slot, of two rings.

According to a further embodiment of the magnet device, the rings have further through-holes in their annular surface. The rings are arranged one above the other in the spiral arrangement such that these further through-holes, because they are aligned with one another, form cooling channels. A further embodiment of the magnet device provides that in the spiral arrangement, spaces are provided between the rings—initial ring, end ring and one or more middle rings—except at the contact sections, in which spaces a filler material for stabilizing the spiral arrangement is arranged. The filler material is preferably an insulating or thermally conductive material. Filler material is preferably selected from a group of materials which includes wax, resin and epoxy resins. The epoxy resins can be filled, for example, with $Al_2O_3$.

Furthermore, a further embodiment of the magnet device provides that conductor layers are preferably superconductor layers which consist of superconducting material. The conductor layers are preferably high-temperature superconductor layers which have 2G high-temperature superconductors. Preferably RE-123 is used, where RE stands for Rare Earth and refers to rare earths with the exception of praseodymium. This superconductor achieves high current densities, a high upper critical magnetic field and a wide temperature use range with at the same time anisotropic behavior and crystal structure. The superconducting materials are embedded in a specific layer structure and form a coated conductor. This structure begins with a metal substrate in the form of a carrier strip, to which a ceramic buffer layer is applied and onto which the actual superconductor is deposited. By means of a protective layer, the superconductor is protected from damage or the electrical contact is simplified.

The use of high-temperature superconductors results in no ohmic losses, relative to the main path of the current. Any normal-conducting electrical contacts that are used for supplying power to the initial and end rings and that are necessary so that the magnet device can be connected to a power source are excluded. Furthermore, normal-conducting transition contacts, for example made of an AgIn solder, can be provided between the rings.

Furthermore, a crystallographic C-axis of the high-temperature superconductor layer is oriented parallel to a longitudinal axis of the spiral arrangement. The orientation of the high-temperature superconductor layer has the consequence that, in the radial direction, material and thermal expansion coefficients are homogeneous and constant for a constant axial position, so that transverse stresses and shear stresses are prevented and degradation problems are avoided.

According to yet another embodiment of the magnet device, the cooling channels extend through the filler material. The magnetic device is cooled with a cryogen, for example with liquid nitrogen (LN2), liquid neon (LNe), liquid hydrogen (LH2) or liquid helium (LHe), so that the conductor layer, if made of a superconducting material, can be put into the superconducting state. This cryogen can flow through the cooling channels and thus cool the magnet device not only from the outside, but also easily reach inner regions, depending on the dimensions of the magnet device.

In a further embodiment of the magnet device, the substrate layers consist of stainless steel, nickel, a nickel alloy or highly corrosion-resistant nickel-molybdenum alloys (Hastelloy®). The insulation materials are preferably made of Kapton, PEEK and polyimides.

According to yet another embodiment, the magnet device provides that the initial ring and the end ring are connected to an electrical contact device at their ends which are not in current-conducting contact with a middle ring. Additionally or alternatively, the electrical contact device can have a persistent-mode bridge. With the persistent-mode bridge, the magnet in its excited state can be disconnected from the power source.

By selection of a corresponding number of rings and different dimensions of the rings, the magnet device is advantageously scalable to the respective desired operating current and magnetic field generation. The rings can be produced in different sizes in order to generate the desired magnetic field flux density for different applications. Dimensions are thus possible whereby the smallest dimension of the inner through-opening is less than the radial dimension of the rings, or the dimension of the inner through-opening is three times as large as the radial dimension of the rings. The magnet device can be used in a rotor or stator in a rotor-stator arrangement of an electric machine.

Other embodiments of the magnet device based on the Bitter principle as well as some of the advantages associated with these and other embodiments will be become clear and more understandable through the following detailed description with reference to the accompanying figures. Objects or parts thereof which are substantially the same or similar can be provided with the same reference numerals. The figures are merely schematic representations of embodiments of the disclosure.

Figure 2:
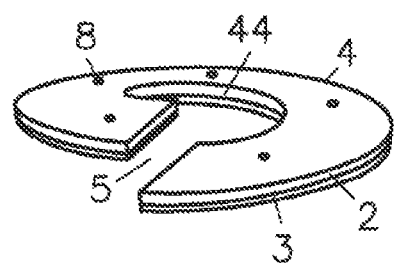
FIG. 2 a perspective view of a ring of the magnet device.
Figure 5:
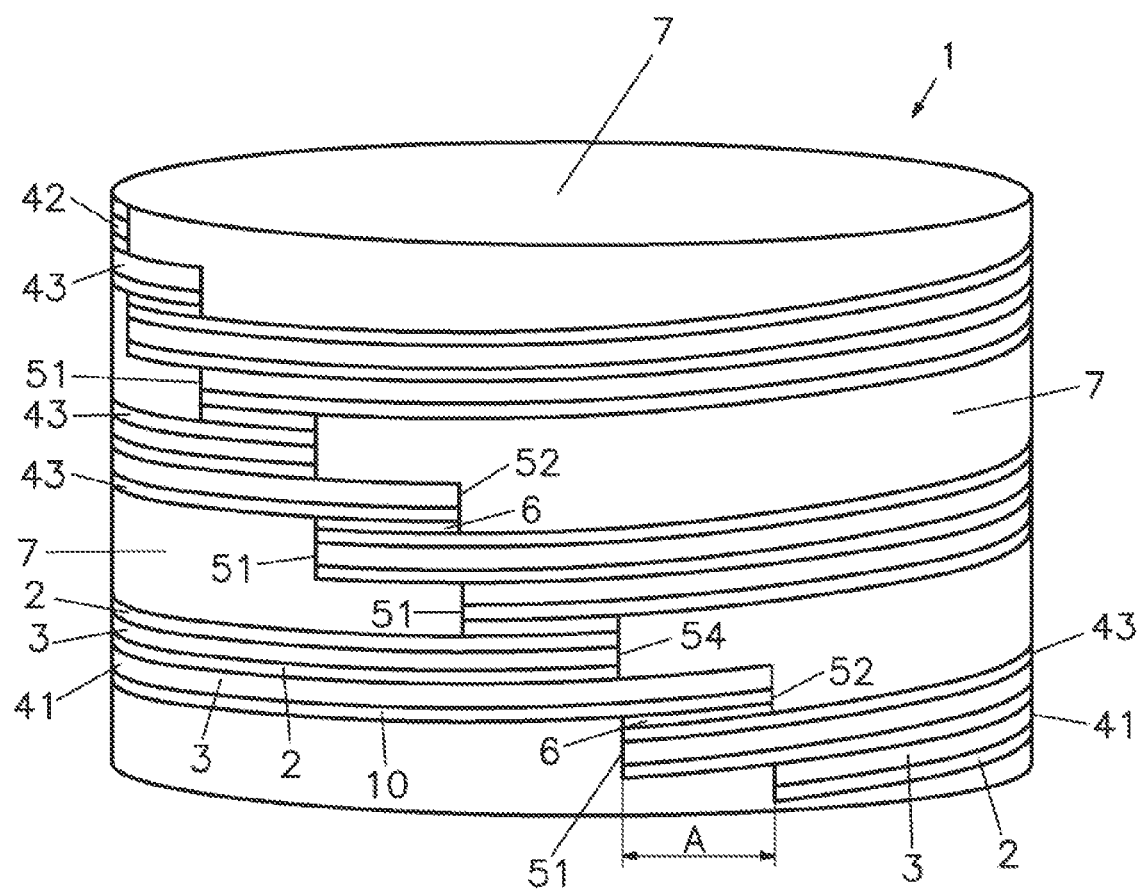
FIG. 5 a perspective view of the spiral arrangement of the magnet device with filler material.

FIG. 1 and FIG. 5 show a magnet device 1 based on the Bitter principle, which is constructed from a plurality of rings 4. Each ring 4, as FIG. 2 also shows, is constructed from two layers: a conductor layer 2 and a substrate layer 3. Each ring 4 has a circular geometry with a central through-hole 44, wherein each ring 4 has a radial slot 5, which extends through the entire ring 4, namely starting from the outer circular ring, which describes the circumference, to the inner circular ring, which delimits the through-hole 44 in the center of the ring 4. The ends 51, 52 of the ring 4 adjoin the slot 5. These ends 51, 52 serve as contact points between the conductor layers 2 of two rings 4 arranged one above the other.

Figure 3:
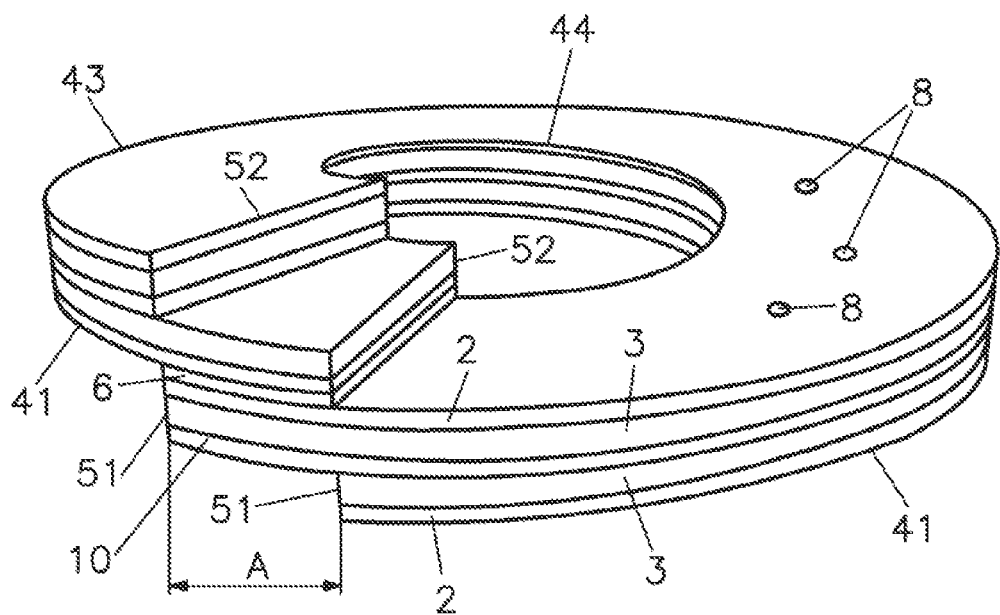
FIG. 3 a schematic view of two rings from the spiral arrangement of the magnet device.

In FIG. 3 it is shown how the rings 4 are placed one on top of the other in such a way that they form a spiral arrangement, as shown in FIG. 1. Here each ring 4 is arranged on its adjacent ring 4 in such a way that a ring 4 with an upward-facing conductor layer 2 adjoins a ring 4 with a downward-facing conductor layer 2. The structure here provides that the conductor layer 2 of the initial ring 41 faces downwards in the figure and the middle ring 43 following it is offset by an offset in a rotationally symmetrical manner and is arranged with its downward-facing conductor layer 2 on the initial ring 41.

Figure 4:
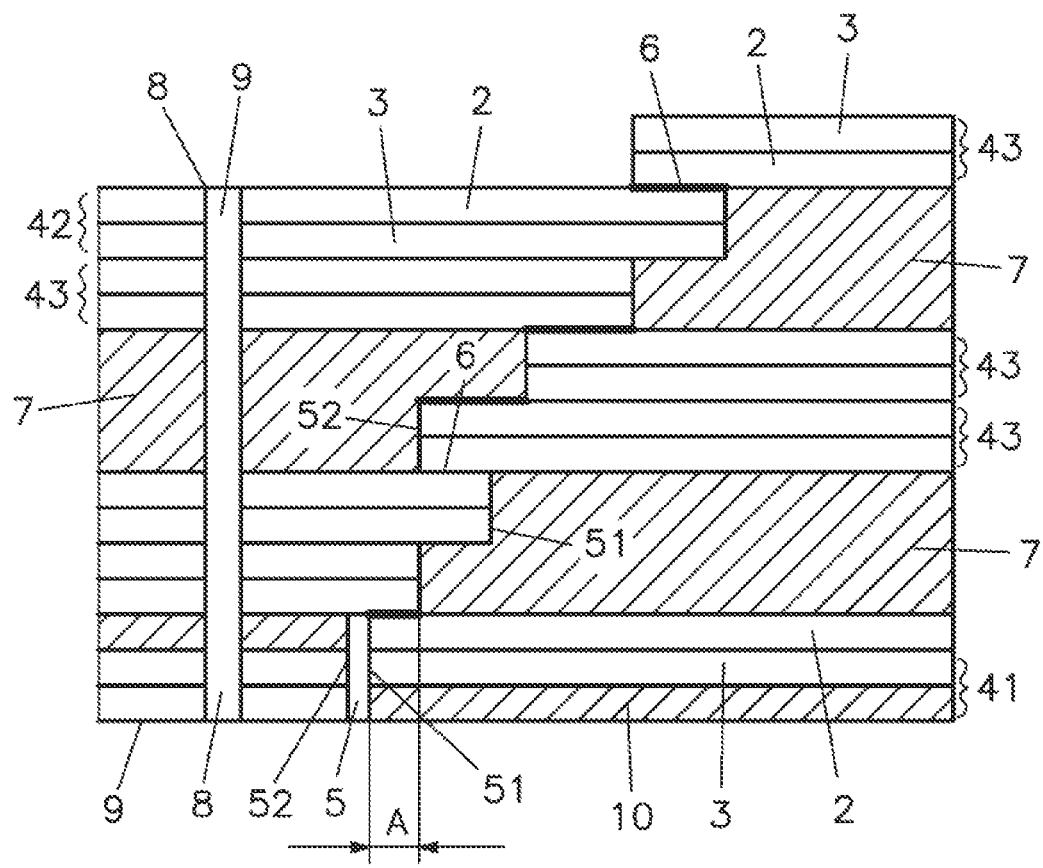
FIG. 4 a schematic partial section through the magnet device.

The initial ring 41 and the subsequent middle ring 43 have an overlap which forms a contact section A and which in its dimension corresponds to the offset. In FIG. 4, a contact material 6 is shown in the gap that is provided between the contacting annular surfaces. In this contact section A, the two conductor layers 2 of the two adjacent rings 41, 43 are in electrical contact, so that a continuous current can flow in the magnet device 1 when current is applied to the magnet device 1. The contact material 6 can be a thin metallic layer. Alternatively, the conductor layers 2 of the two adjacent rings 41, 43 can be sintered together in the contact section A in order to produce a good electrical contact.

Between the substrate layers 3 of the initial ring 41 and of the middle ring 43, an insulating layer 10 is introduced (see FIGS. 1 and 3). It serves to electrically separate the two rings 41, 43 from each other and to avoid current redistribution currents. In the contact section A, one end 52 of the initial ring 41 rests on the other end 51 of the middle ring 43. This is repeated with the next middle ring 43, the one end of which now rests on one end of the ring 43 and thus overlaps in the contact section A there. Due to the rotationally symmetrical offset of the individual rings 41, 42, 43, a spiral-shaped arrangement is formed. In this case, the rings 41, 42, 43 are arranged relative to one another in such a way that the odd-numbered rings 41, 42, 43 face upwards with their conductor layer 2 and the even-numbered rings 42, 43 face upwards with their substrate layer 3.

The magnet device 1 is terminated by an end ring 42 which is arranged such that in FIG. 1 its substrate layer 3 faces upwards.

FIG. 4 shows how the individual layers of the individual rings 41, 42, 43 are placed one above another. Thus, the overlap in the contact section A is again clearly shown here, in which the intermediate contact material 6 is present in order to improve the electrical contact between the contacting conductor layers 2. In order to impart stability to the magnetic device 1, a filler material 7, such as, for example, an epoxy resin, is provided between the sections of the rings 41, 42, 43 which are not in contact with each other. In FIG. 5 the layering of the rings 41, 42, 43 of the magnet device 1 together with the filler material 7 is shown.

In order to supply current to the magnet device 1, electrical terminals 11 are arranged at one end 51 of the initial ring 41 and at the end 52 of the end ring 42, as FIG. 1 shows. In this way, the spiral arrangement of the magnet device 1 can be connected to a current-supplying source or a persistent-mode bridge and can produce continuous current operation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Magnet device
2 Conductor layer
3 Substrate layer
4 Ring
41 Initial ring
42 End ring
43 Middle ring
44 Central through-hole
5 Slot
51 End adjacent to slot
52 End adjacent to slot
6 Contact material
7 Filler material
8 Through-holes
9 Cooling channels
10 Insulation layer
11 Electrical contact device

The invention claimed is:

1. A magnet device based on the Bitter principle, the magnet device comprising:
a plurality of conductor layers, and
a plurality of substrate layers,
wherein each respective substrate layer carries a respective corresponding conductor layer,
wherein each respective substrate layer and corresponding respective conductor layer together form a respective ring having a radial slot extending through the entire respective ring,
wherein the plurality of conductor layers and the plurality of substrate layers together form three or more rings in a spiral arrangement with an initial ring, an end ring, and one or more middle rings,
wherein the initial ring and the end ring, each having an end adjacent to a respective slot are, via a contact section, in current-conducting contact with at least one respective middle ring of the one or more middle rings at an end of the respective middle ring adjacent to the respective slot,
wherein each middle ring has two ends adjacent to a respective slot and is, via a contact section, in current-conducting contact with two other rings, and
wherein the three or more rings are arranged alternately such that a ring with a downward-facing conductor layer follows a ring with an upward-facing conductor layer.

2. The magnet device according to claim 1, wherein the two respective contacting rings overlap each other at a respective contact section, and/or
a contact material is applied to a respective contact section in a planar manner, or
the conductor layers that face each other of the two respective contacting rings are sintered together at the contact section.

3. The magnet device according to claim 2, wherein the contact material is a material that is superconducting during operation of the magnet device, and
wherein the contact material is a layer comprising indium, tin, lead, or niobium.

4. The magnet device according to claim 1, wherein the three or more rings have through-holes in their annular surfaces,
and the rings in the spiral arrangement are arranged one above the other such that that the through-holes of the rings are aligned with one another to form cooling channels.

5. The magnet device according to claim 1, wherein in the spiral arrangement, respective spaces are provided between the three or more rings except at contact sections,
wherein a filler material for stabilizing the spiral arrangement is arranged in the respective spaces.

6. The magnet device according to claim 5, wherein the cooling channels extend through the filler material.

7. The magnet device according to claim 1, wherein the plurality of conductor layers are superconductor layers.

8. The magnet device according to claim 1, wherein the plurality of substrate layers comprise stainless steel, nickel, nickel alloys, or nickel-molybdenum alloys.

9. The magnet device according to claim 1, wherein the initial ring and the end ring are connected to an electrical contact device at respective ends that are not in current-conducting contact with a middle ring, and/or
the electrical contact device is a persistent-mode bridge.

10. A coil in a rotor-stator arrangement of an electric machine, wherein the coil comprising the magnet device according to claim 1.

11. The magnet device according to claim 5, wherein the filler material is an insulating and/or thermally conductive material.

12. The magnet device according to claim 7, wherein the superconductor layers are high-temperature superconductor layers, which have a 2G high-temperature superconductor, preferably RE-123, wherein a crystallographic C-axis of the high-temperature superconductor layer is oriented parallel to a longitudinal axis of the spiral arrangement.

* * * * *